(12) United States Patent
Park et al.

(10) Patent No.: US 10,581,739 B2
(45) Date of Patent: Mar. 3, 2020

(54) SYSTEM FOR VERIFICATION OF UNREGISTERED DEVICE BASED ON INFORMATION OF ETHERNET SWITCH AND METHOD FOR THE SAME

(71) Applicants: HYUNDAI MOTOR COMPANY, Seoul (KR); KIA MOTORS CORPORATION, Seoul (KR)

(72) Inventors: Seong Jin Park, Suwon-si (KR); Woo Sub Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 269 days.

(21) Appl. No.: 15/700,874

(22) Filed: Sep. 11, 2017

(65) Prior Publication Data

US 2018/0077062 A1   Mar. 15, 2018

(30) Foreign Application Priority Data

Sep. 12, 2016  (KR) .......................... 10-2016-0117552
Jul. 28, 2017   (KR) .......................... 10-2017-0096351

(51) Int. Cl.
*H04L 29/08* (2006.01)
*H04L 29/06* (2006.01)
*G07C 5/08* (2006.01)
*H04L 12/741* (2013.01)

(52) U.S. Cl.
CPC .......... *H04L 45/745* (2013.01); *G07C 5/0808* (2013.01); *G07C 5/0841* (2013.01); *H04L 63/08* (2013.01); *H04L 63/0853* (2013.01); *H04L 63/101* (2013.01); *H04L 63/126* (2013.01); *H04L 67/12* (2013.01)

(58) Field of Classification Search
CPC ... H04L 45/745; H04L 63/126; H04L 63/101; H04L 63/08; H04L 63/0853; H04L 67/12; G07C 5/0841; G07C 5/0808
See application file for complete search history.

(56) References Cited

U.S. PATENT DOCUMENTS

| | | | |
|---|---|---|---|
| 2010/0238811 A1* | 9/2010 | Rune ....................... | H04L 12/66 370/248 |
| 2012/0044527 A1* | 2/2012 | Panko .................... | G07C 5/008 358/1.15 |
| 2016/0278017 A1* | 9/2016 | Koike ............... | H04W 52/0235 |
| 2016/0359731 A1* | 12/2016 | Kaku ...................... | H04L 45/18 |
| 2017/0041161 A1* | 2/2017 | Kaku .................... | H04L 12/437 |
| 2017/0093834 A1* | 3/2017 | Natu ..................... | H04L 45/745 |

* cited by examiner

*Primary Examiner* — Nelson S. Giddins
(74) *Attorney, Agent, or Firm* — Morgan, Lewis & Bockius LLP

(57) ABSTRACT

An operation method of a first communication node among a plurality of communication nodes constituting an Ethernet-based vehicle network may comprise receiving a message from a second communication node; determining whether a source address of the message exists in a first address table stored in a memory of the first communication node; and transmitting the message and information on the source address of the message to a management node in response to determining that the source address of the message exists in the first address table.

18 Claims, 6 Drawing Sheets

80 00 20 20 20 3A AE
Source MAC Address

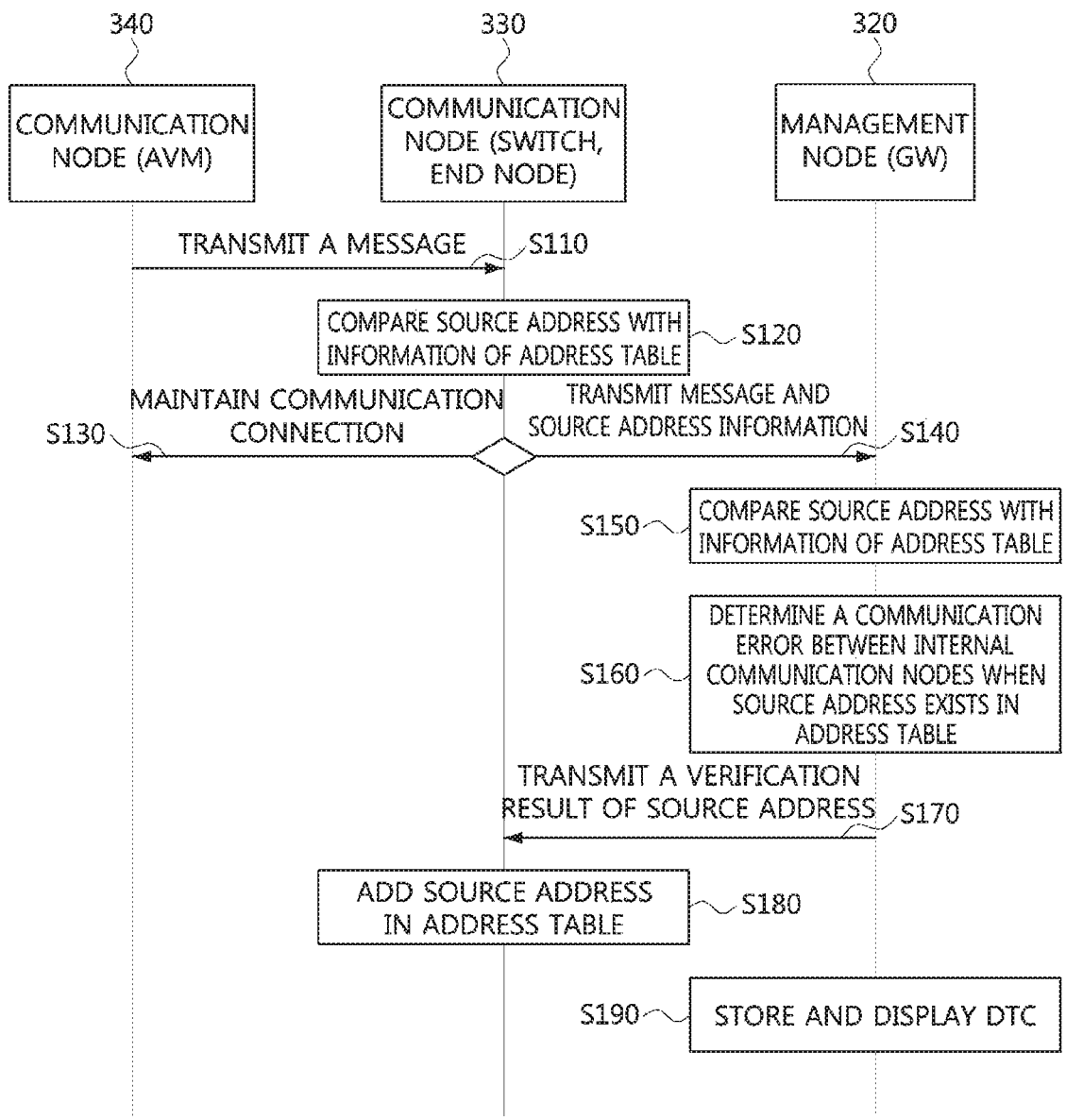

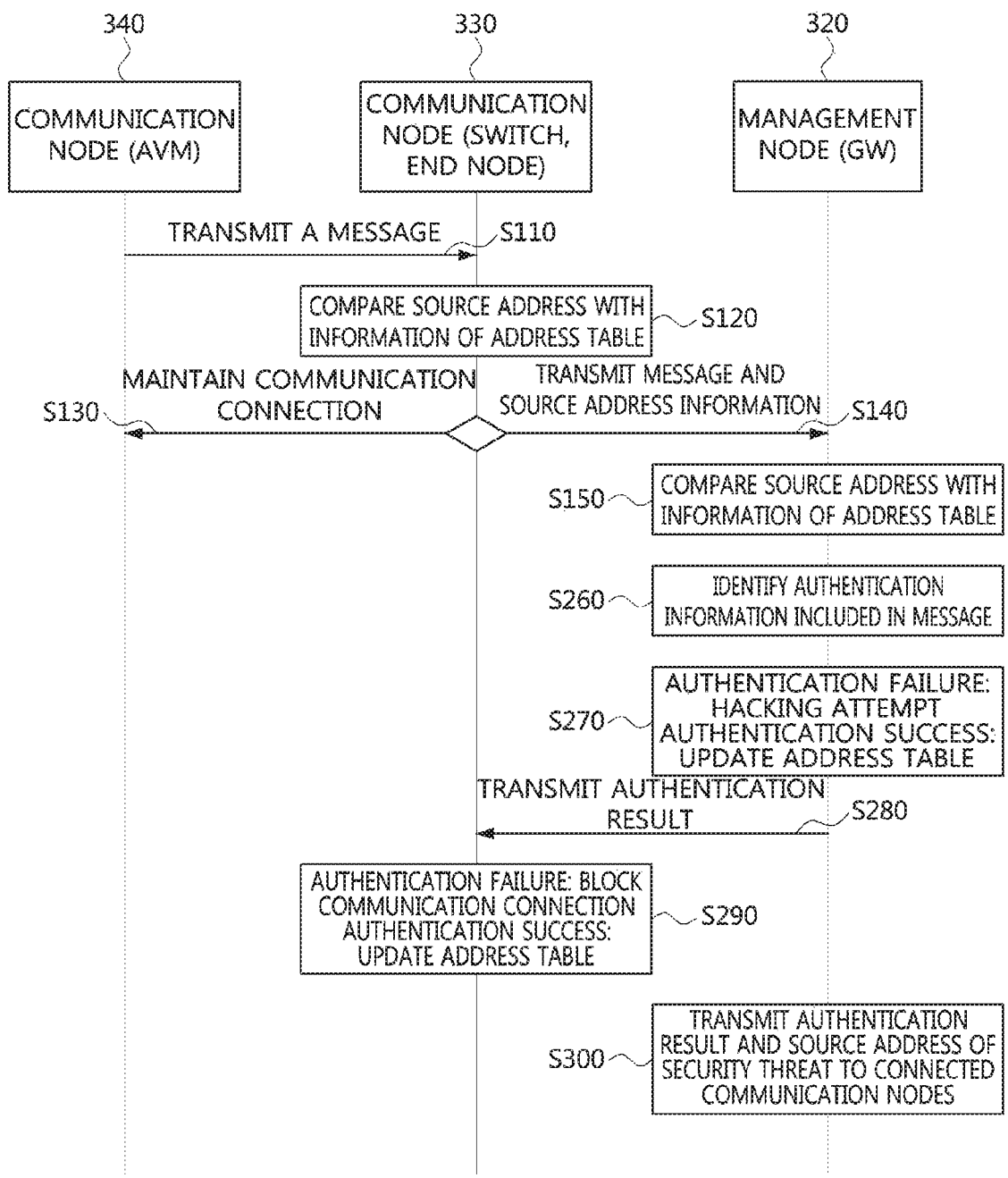

SYSTEM FOR VERIFICATION OF UNREGISTERED DEVICE BASED ON INFORMATION OF ETHERNET SWITCH AND METHOD FOR THE SAME

CROSS-REFERENCE TO RELATED APPLICATIONS

This application claims the benefit of and priorities to Korean Patent Applications No. 10-2016-0117552 filed on Sep. 12, 2016 and No. 10-2017-096351 filed on Jul. 28, 2017 in the Korean Intellectual Property Office (KIPO), the entirety of which are incorporated by reference as if fully set forth herein.

TECHNICAL FIELD

The present disclosure relates to a system and a method for diagnosing a communication error in an Ethernet-based vehicle network or detecting an erroneous external communication apparatus connected to the Ethernet-based vehicle network, and more specifically, to a system and a method for diagnosing a communication error of a communication apparatus and verifying an unregistered device based on information that Ethernet switches have.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Meanwhile, the telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The system configuration of the vehicle network is expanding in terms of connectivity with the outside as well as the in-vehicle network as compared with the existing CAN based communication network. Ethernet communications are being applied to the in-vehicle network in consideration of a wider range of applications such as communications with a cloud server for communication devices and connected cars.

However, when the Ethernet communications are applied to the in-vehicle network, possibility of malfunction due to security threats to the vehicle and communication errors may increase as communications with an external device, that cannot be considered in advance, increase. Therefore, there is a need for measures to counter such the security threats and communication errors. Also, an unintentional error may occur due to a system failure or an error of an internal device as well as an external device, and a method for diagnosing such the error is needed.

SUMMARY

In order to resolve the above-described problems, the present disclosure provides a system and a method for diagnosing communication errors of internal and external devices connected to an Ethernet-based vehicle network based on information that Ethernet switches have.

Also, the present disclosure provides a system and a method for verifying an unregistered device connected to an Ethernet-based vehicle network based on information that Ethernet switches have.

Also, the present disclosure provides a system and a method for detecting a malfunction due to a communication error and a security threat of an unregistered device based on information that Ethernet switches have.

In accordance with embodiments of the present disclosure, an operation method of a first communication node among a plurality of communication nodes constituting an Ethernet-based vehicle network may comprise receiving a message from a second communication node; determining whether a source address of the message exists in a first address table stored in a memory of the first communication node; and in response to determining that the source address of the message exists in the first address table, transmitting the message and information on the source address of the message to a management node.

The operation method may further comprise receiving a verification result for the source address of the message from the management node.

The operation method may further comprise adding the source address in the first address table when the source address of the message is determined to exist in a second address table stored in the management node based on the verification result.

A communication error between communication nodes constituting the Ethernet-based vehicle network may be determined when the source address of the message is determined to exist in a second address table stored in the management node based on the verification result.

The operation method may further comprise transmitting information on the source address of the message to a third communication node connected to the first communication node when the source address of the message is determined to exist in a second address table stored in the management node based on the verification result.

The operation method may further comprise receiving an authentication result for the message from the management node.

The operation method may further comprise adding the source address in the first address table when the message is determined as being authenticated based on the authentication result.

The operation method may further comprise transmitting information on the source address to a third communication node connected to the first communication node.

The operation method may further comprise releasing a communication connection between the first communication node and the second communication node when the message is determined as being not authenticated based on the authentication result.

Further, in accordance with embodiments of the present disclosure, an operation method of a management node in an Ethernet-based vehicle network may comprise receiving a message and information on a source address of the message from a first communication node; determining whether the source address of the message exists in an address table stored in a memory for all communication nodes constituting the Ethernet-based vehicle network; in response to determining that the source address of the message exists in the address table, transmitting a verification result for the source address to the first communication node; and in response to determining that the source address of the message does not exist in the address table, performing an authentication of the message.

The operation method may further comprise transmitting the source address and a verification result for the source address to a second communication node connected to the management node when the source address exists in the address table.

The operation method may further comprise storing a diagnostic trouble code indicating a communication error in the memory and displaying the diagnostic trouble code in at least one of a visual manner and an auditory manner when the source address exists in the address table.

The operation method may further comprise transmitting the diagnostic trouble code to a diagnostic apparatus connected to the management node.

The operation method may further comprise transmitting an authentication result for the message to the first communication node.

The operation method may further comprise adding the source address of the message in the address table when the message is determined as being authenticated based on the authentication result.

The operation method may further comprise transmitting the source address and the authentication result to a second communication node connected to the management node when the message is determined as being authenticated based on the authentication result.

The operation method may further comprise discarding the message and transmitting the source address and the authentication result to the first communication node and a second communication node connected to the management node when the message is determined as being not authenticated based on the authentication result.

Further, in accordance with embodiments of the present disclosure, a management node constituting an Ethernet-based vehicle network may comprise a processor and a memory storing at least one instruction executed by the processor and an address table for all communication nodes constituting the Ethernet-based vehicle network. Also, the at least one instruction may be configured to receive a message from a first communication node, and determine whether or not the source address of the message exists in the address table; in response to determining that the source address of the message exists in the address table, transmit a verification result for the source address to the first communication node; and in response to determining that the source address of the message does not exist in the address table, perform an authentication of the message.

The at least one instruction may be further configured to transmit an authentication result of the message to the first communication node.

The at least one instruction may be further configured to add the source address in the address table when the message is determined as being authenticated based on the authentication result.

The system and method based on the information of Ethernet switches according to the embodiments of the present disclosure can diagnose a communication error of internal or external communication nodes connected to the Ethernet network.

The system and method based on the information of Ethernet switches according to the embodiments of the present disclosure can check a source address of a message received at a communication node and check whether the communication node transmitting the message has been registered or not.

The system and method based on the information of Ethernet switches according to the embodiments of the present disclosure can determine whether to authenticate an external device and whether to maintain a communication connection with the external device. Then, a communication connection with an unregistered (unauthenticated) device can be blocked. On the other hand, a source address of a registered (authenticated) device can be updated to address tables of communication nodes.

The system and method based on the information of Ethernet switches according to the embodiments of the present disclosure can prevent unauthenticated operations due to a system failure or error of the internal or external devices of the vehicle.

BRIEF DESCRIPTION OF DRAWINGS

Embodiments of the present disclosure will become more apparent by describing in detail forms of the present disclosure with reference to the accompanying drawings, in which:

FIG. 8 shows a sequence chart for explaining operations of communication nodes focusing a method for detecting a communication error and updating a source address based on information of Ethernet switches according to an embodiment of the present disclosure; and FIG. 9 shows a sequence chart for explaining operations of communication nodes focusing a method for detecting an unregistered device and updating a source address based on information of Ethernet switches according to an embodiment of the present disclosure.

Figure 1:
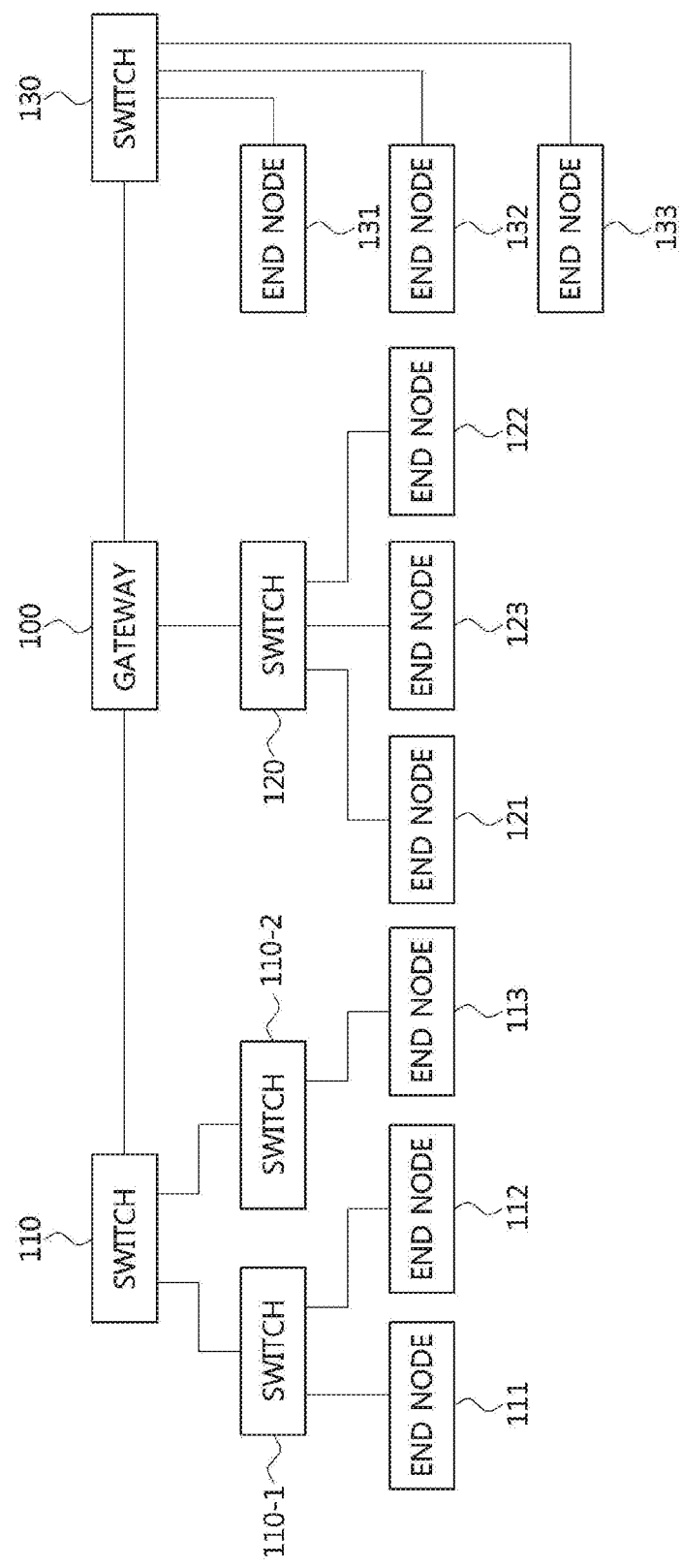
FIG. 1 shows a block diagram illustrating an embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

In a case that the devices constituting the Ethernet-based network change dynamically as time elapses, an address table in an Ethernet switch may be updated through a medium access control (MAC) learning which is a basic function of the Ethernet switch. On the other hand, in a restricted network environment, such as an in-vehicle network, where locations or addresses of devices constituting the network are defined in a static manner, an unnecessary MAC learning process may be omitted by predefining the address table in the Ethernet switch. This makes it possible to improve the efficiency of network communication processing and the efficiency of network management. The present disclosure proposes embodiments of a system and a method for diagnosing a communication error in an internal or external device in the Ethernet-based vehicle network and detecting an unregistered (unauthenticated) external device based on information that the Ethernet switches have when performing communications between external devices and the vehicle to which the Ethernet network is applied by utilizing such the characteristics of the in-vehicle network and functions of the Ethernet switches constituting the in-vehicle network.

FIG. 1 shows a block diagram illustrating an embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and/or 130, and may be configured to connect different networks. For example, the gateway 100 may support connections between a switch which supports a controller area network (CAN) (or, FlexRay, media oriented system transport (MOST), or local interconnect network (LIN)) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring (AVM) device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. Embodiments of the present disclosure may be applied to the vehicle network connected in one of the above-described topologies, but a network topology applied to embodiments of the present disclosure may be configured variously without being limited thereto.

Figure 2:
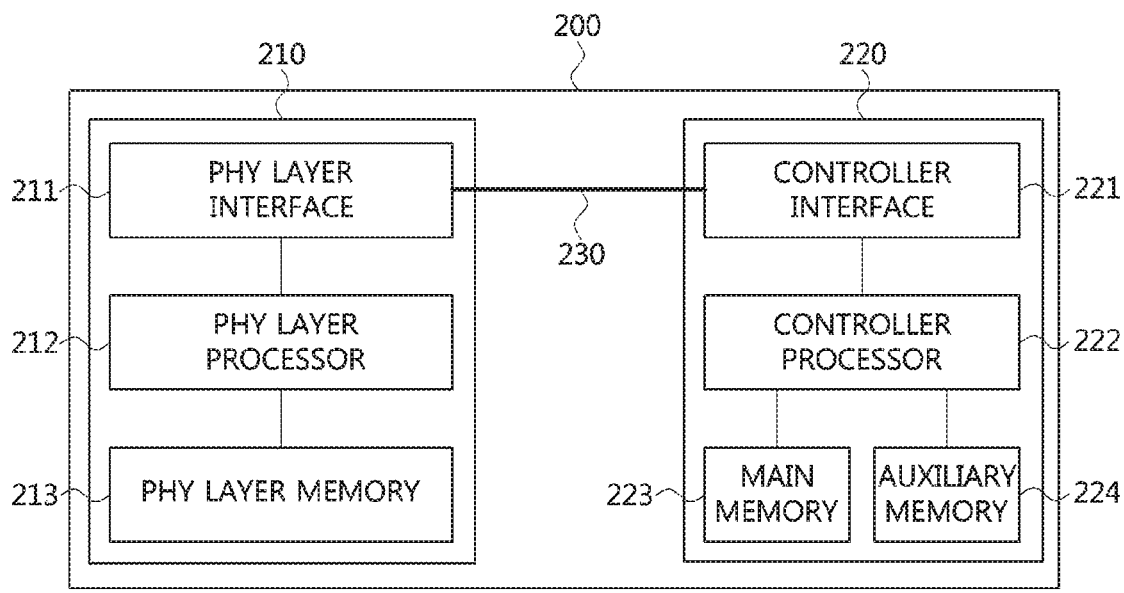
FIG. 2 shows a block diagram illustrating an embodiment of a communication node belonging to a vehicle network.

FIG. 2 is a block diagram illustrating a first embodiment of a communication node belonging to a vehicle network.

Referring to FIG. 2, a communication node 200 constituting a vehicle network (e.g., the vehicle network illustrated in FIG. 1) may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), and a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Hereinafter, a method performed at a communication node belonging to a vehicle network and a corresponding counterpart communication node will be described. Hereinafter, even when a method (e.g., transmission or reception of a message) to be performed at a first communication node is described, a corresponding second communication node may perform a method corresponding to the method performed at the first communication node (e.g., receiving or transmitting the message). That is, when the operation of the first communication node is described, the corresponding second communication node may perform an operation corresponding to the operation of the first communication node. Conversely, when the operation of the second communication node is described, the corresponding first communication node may perform an operation corresponding to the operation of the switch.

Figure 3:
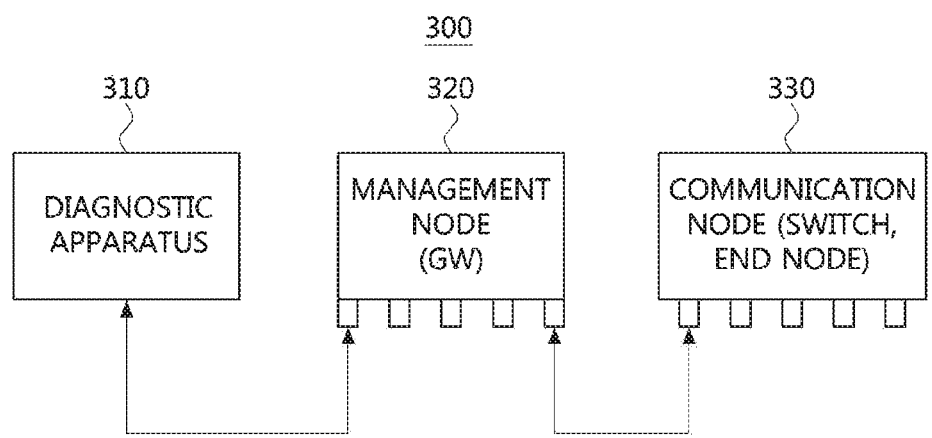
FIG. 3 shows a block diagram illustrating a system for diagnosing a communication error of a communication apparatus and detecting an unregistered device based on information that Ethernet switches have according to an embodiment of the present disclosure.
Figure 4:
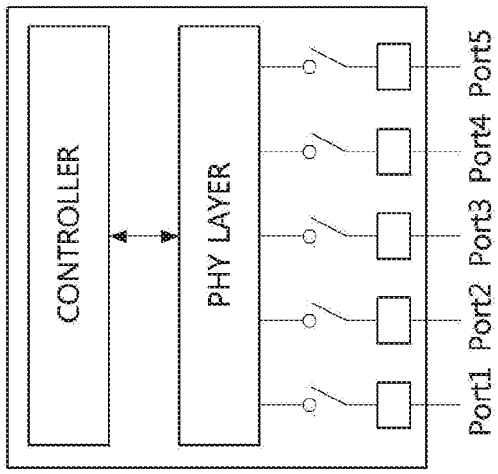
FIG. 4 shows a conceptual diagram illustrating a configuration of an Ethernet switch.

FIG. 3 is a block diagram illustrating a system for diagnosing a communication error of a communication apparatus and detecting an unregistered device based on information that Ethernet switches have according to an embodiment of the present disclosure, and FIG. 4 is a conceptual diagram illustrating a configuration of an Ethernet switch.

Referring to FIGS. 3 and 4, a system 300 according to an embodiment of the present disclosure may comprise a diagnostic apparatus 310, a management node 320, and at least one communication node 330. Here, the management node 320 and the at least one communication node 330 may be located inside a vehicle, and the diagnostic apparatus 310 may be located outside the vehicle. As shown in FIG. 4, switching elements may be placed between a PHY layer and respective communication ports (ports 1, 2, 3, 4 and 5) of each of the at least one communications node 330, which may be physical elements or logical elements.

The diagnostic apparatus 310 may be connected to the Ethernet network of the vehicle to diagnose a communication error and identify a type of a communication error of each of the at least one communication node 330 (e.g., a control unit of the vehicle) of the vehicle. The diagnostic apparatus 310 may load an error record of the vehicle by using its self-diagnosis function and display it on a screen, and may update firmware of an end node, a switch, and a gateway of the vehicle. Also, the diagnostic apparatus 310 may update information on source addresses of pre-registered external devices connected to the Ethernet network of the vehicle to memories of the in-vehicle devices (e.g., the end node, the switch, the gateway, etc.). Also, the diagnostic apparatus 310 may update information on source addresses (e.g., source MAC addresses) of unregistered (or unauthenticated) external devices in the memories of the in-vehicle devices as being connected to the Ethernet network of the vehicle.

Each of the at least one communication node 330 may include an Electronic Control Unit (ECU), a memory (not shown), and a plurality of communication ports. As such the at least one communication node 330, a switch and an end node may be applied. As an example of an end node, various control units (or, controllers) of the vehicle may be applied.

Since connection relationship between the in-vehicle devices disposed therein does not change when the vehicle operates, the at least one communication node 330 may identify from which a message is received according to information on an address assigned to each communication port.

As an example, an address table for communication ports described in Table 1 below may be stored in a memory of each of the at least one communication node 330. Here, a source MAC address for each communication port may be stored in the address table.

TABLE 1

| Port number | MAC address |
| --- | --- |
| 1 | 00-10-A0-C0-00-01 |
| 2 | 00-10-A0-C0-00-02 |
| 3 | 00-10-A0-C0-00-03 |
| 4 | 00-10-A0-C0-00-04 |
| 5 | 00-10-A0-C0-00-05 |

Figure 5:
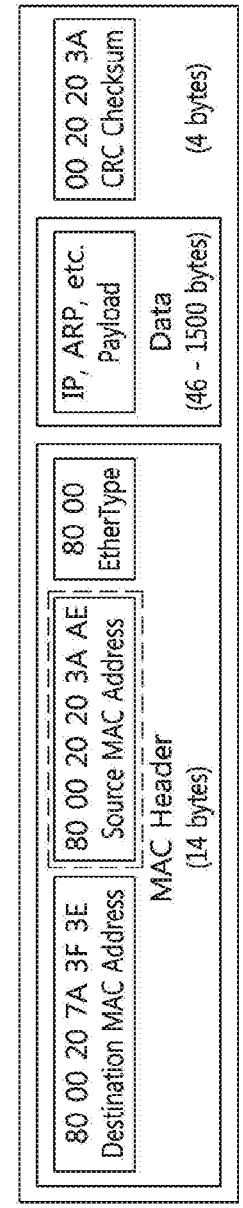
FIG. 5 shows a conceptual diagram illustrating an Ethernet data frame format.

FIG. 5 is a conceptual diagram illustrating an Ethernet data frame format.

Referring to FIG. 5, a communication node (e.g., a gateway, a switch, or an end node) of the vehicle may transmit and receive Ethernet data using the frame format shown in FIG. 5. The frame format of the Ethernet data may comprise a preamble (not shown), a MAC header, a data payload, and a frame check sequence (FCS).

The preamble may be added and transmitted at a PHY layer of a transmitting side so that a receiving side can synchronize with a reception time of the frame. Although not shown in FIG. 5, a start of frame delimiter (SFD) may be placed after the preamble to indicate a start of a normal frame. The MAC header may include a destination MAC address field indicating a receiver's MAC address, a source MAC address field indicating a transmitter's MAC address, and an Ethernet type field that defines the length and the type of the Ethernet data. The data payload may include data encapsulated from a protocol of a higher layer. The FCS may be used to determine an error of the received frame, a cyclic redundancy check (CRC) may be added by the transmitting side, and the CRC may be checked by the receiving side, so that the received frame can be checked for errors.

The communication node 330 (switch or end node) may transmit and receive data to and from other communication nodes (switches or end nodes) or gateways of the vehicle by using the Ethernet data frame format. That is, the communication node 330 may transmit and receive data with an internal controller disposed in the vehicle or an external controller disposed outside the vehicle.

A message transmitted and received between the management node 320 and the communication node 330 located inside the vehicle may include authentication information. Here, the authentication information may be included in the message to verify whether the transmission or reception of the message is successful and whether the message belongs to a normal communication connection with the communication node 330 in the vehicle. Also, the authentication information may be included in the message to verify whether the transmission or reception of the message received at the communication node 330 from an external device outside the vehicle is successful and to verify a communication connection with the external device outside the vehicle.

For example, the communication node 330 may check the destination address field and the source address field of the MAC header included in the data frame to identify the source and destination of the data. Also, the communication node 330 may check the destination address field and the source address field of the MAC header included in the data frame to determine whether the message has been received from a normal (i.e., registered) communication node capable of connecting to the Ethernet network of the vehicle. That is, the communication node 330 may confirm whether the message has been normally received from a registered internal device or a registered external device by identifying the destination address field and the source address field of the MAC header included in the data frame.

Upon receiving the message, the communication node 330 may compare the source address of the received message (e.g., the source MAC address) with the information of the address table stored in the memory. Here, the communication node 330 may determine whether the information of the address table stored in the memory matches the source address of the message received from the internal or external device of the vehicle. That is, the communication node 330 may compare the information of the address table stored in the memory with the source address of the received message to determine whether the source address of the message received at the communication node 330 exists in the address table of the memory of the communication node 330. Accordingly, it is made possible to determine whether the message received at the communication node 330 is a normal message received from a normal (registered or authenticated) in-vehicle device or external device.

As a result of the determination, when a message having a source address not matched with the address table stored in the memory of the communication node 330 is received, the communication node 330 may transmit the message and information on a communication port (i.e., port number) through which the message is received to the management node 320 capable of verifying source addresses of all the controllers of the vehicle. That is, if the source address of the message received at the communication node 330 is not present in the address table stored in the memory of the communication node 330, the communication node 330 may transmit the received message and the information of the source address of the received message to the management node 320.

Figure 6:
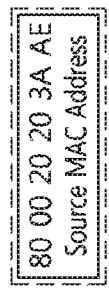
FIG. 6 shows a conceptual diagram illustrating an example of a source address included in a frame received at an end node.

For example, an address table is stored in the memory of the management node 320. This address table stores the source addresses of the gateways, switches, and end nodes which are disposed inside the vehicle, and communication nodes connected from the outside of the vehicle. Accordingly, the management node 320 may verify the source addresses of the gateways, switches, end nodes, and external communication nodes by using the address table. The communication node 330 may transmit source address information as shown in FIG. 6 through a specific communication port connected to the management node 320 for authentication on the source address of the received message.

Although FIGS. 3 and 4 illustrate that the communication node 330 and the management node 320 respectively have five communication ports, the number of communication ports may be changed according to the number of connected apparatuses.

The management node 320 may include a memory (not shown) and a plurality of communication ports, and may be capable of receiving messages and source address information of the messages from the communication node 330 via the specific communication port. For example, the communication node 330 may transmit the source address information shown in FIG. 6 to the managed node 320.

A gateway (GW) may be applied as the management node 320, and at least one instruction executed by a PHY layer and a controller is stored in the memory of the management node 320. Also, the memory of the management node 320 may store an address table including source addresses (e.g., source MAC addresses) of all communication nodes (gateways, switches, end nodes, etc.) of the vehicle. Further, the memory of the management node 320 may store a source address table for external communication nodes connected from outside the vehicle.

For example, as shown in Table 2 below, source MAC addresses for respective communication ports of the management node 320 may be stored in the memory of the management node 320 in a form of a table. Also, in the memory of the management node 320, the source MAC addresses of the respective communication ports of the communication node 330 may be stored in a form of a table.

TABLE 2

| | Port number | MAC address |
| --- | --- | --- |
| GW | 1 | 00-10-A0-C0-00-0A |
| | 2 | 00-10-A0-C0-00-0B |
| | 3 | 00-10-A0-C0-00-0C |
| | 4 | 00-10-A0-C0-00-0D |
| ECU1 | 1 | 00-10-A0-C0-00-01 |
| | 2 | 00-10-A0-C0-00-02 |
| | 3 | 00-10-A0-C0-00-03 |
| | 4 | 00-10-A0-C0-00-04 |

In Table 2, 'GW' means the management node 320, and 'ECU1' means the communication node 330 connected to the management node 320. Also, MAC addresses assigned to respective communication ports of the management node 320 and MAC addresses assigned to respective communication ports of the communication node 330 are described.

When the source address of the message is received at the management node 320 from the communication node 330, the management node 320 may compare the received source address with information of the address table stored in the memory. Accordingly, the management node 320 may determine whether or not the information of the address table stored in the memory matches the source address of the message received from the communication node 330. That is, the management node 320 may determine whether the message has been normally received from a pre-registered controller (an internal device and an external device of the vehicle). Here, the address table stored in the memory of the management node 320 may include information on the MAC addresses of the in-vehicle devices and the MAC addresses of the external devices connected from outside of the vehicle.

The management node 320 may determine that a message has been received from the vehicle's internal device if the information in the address table stored in the memory matches the source address information received from the communication node 330. Accordingly, the management node 320 may determine that a communication error has occurred between the internal devices of the vehicle. That is, the management node 320 may determine that there is a communication error between the internal devices of the vehicle when the source address received from the communication node 330 exists in the address table stored in the memory. At this time, the management node 320 may transmit the information on the source address of the received message to the communication node 330. The communication node 330 may update its address table by adding the source address received from the management node 320 to its address table stored in the memory.

Then, the management node 320 may store a diagnostic trouble code (DTC) in the memory of the management node 320 indicating a communication error between the internal devices of the vehicle. That is, although the source address of the frame received at the communication node 330 does not match the MAC address information of the address table stored in the memory of the communication node 330, a case that the source address of the frame received at the communication node 330 matches a MAC address of the address table stored in the memory of the management node 320 may occur. In this case, the management node 320 may determine that a communication error has occurred, and store a diagnostic trouble code (DTC) indicating the communication error between the internal devices of the vehicle in the memory of the management node 320.

Also, the management node 320 may display the DTC indicating the communication error between the internal devices of the vehicle to a user (or, a driver) in at least one of a visual manner and an auditory manner. That is, it is possible to turning on a warning light indicating the DTC, or to display the DTC on a display screen. It is also possible to output a warning sound indicating the DTC or to output the DTC as an audio signal. This may allow the user (or, the driver) to be warned of the communication error between the internal controllers. Also, the management node 320 may transmit the DTC indicating the communication error between the internal devices of the vehicle to the diagnostic apparatus 310 to update the firmware of the gateway, the switch, and the end nodes of the vehicle. Also, the management node 320 may guide the user (or, the driver) to necessity of a service for resetting connections of the internal controllers.

As another example, if the MAC address of the address table stored in the memory and the source address of the frame received from the communication node 330 does not match, the management node 320 may perform an authentication procedure of the device having transmitted the message. At this time, when the MAC address of the address table stored in the memory and the source address of the frame received from the communication node 330 does not match, the management node 320 may determine that the message has been received from an external communication node newly connected to the network of the vehicle.

Then, the management node 320 may identify the authentication information included in the received message. That is, when the authentication information for the received message does not exist or the authentication information included in the message does not match preset authentication information, the management node 320 may determine that the message has been received from an unauthenticated (i.e., unregistered) external device connected to the vehicle's Ethernet network. That is, the management node 320 may determine that the message has been received from an unauthenticated external device.

If the external device that transmitted the message is a device that has been authenticated by a manufacturer of the vehicle, the management node 320 may determine that the communication error occurred because the communication node 330 does not recognize the new communication node.

Also, the management node 320 may add the source address of the normal external device authenticated by the manufacturer to the address table stored in the memory of the management node 320.

Also, in the case that the message has been received from the normal external device authenticated by the manufacturer, the management node 320 may transmit an authentication result to the communication node 330 as a result of checking the authentication information of the message.

Also, the management node 320 may transmit the source address of the normal external device authenticated by the manufacturer to other communication nodes, switches, or gateways connected thereto.

The communication node 330 receiving the authentication result from the management node 320 may add the source address of the normal external device authenticated by the manufacturer to the address table stored in the memory of the communication node 330. Further, the communication node 330 may transmit the authentication result and the source address of the received message to other communication nodes, switches, and gateways connected to the communication node 330 so as to update the address tables of the other communication nodes, the switches, and the gateways.

Meanwhile, in a case that the management node 320 determines that the message has been received message from an external device (mobile communication device or Internet-of-thing (IoT) device) which has not been authenticated by the manufacturer of the vehicle, the management node 320 may determine that a communication error due to an external security threat (e.g., hacking). That is, in the case that the message has been received from an external device that has not been authenticated by the vehicle manufacturer, the management node 320 may determine that a communication error has occurred due to an external security threat (e.g., hacking). Then, the management node 320 may transmit an authentication result to the communication node 330 to notify that a communication error has occurred due to an external security threat. Upon receiving the authentication result from the management node 320, the communication node 330 may release a communication connection of a communication port connected to the unauthenticated external device. At this time, the communication node 330 may release the communication connection between a communication port and the unauthenticated external device by turning off a switching element connecting the PHY layer and the communication port.

As described above, in the case that the management node 320 receives a message from an erroneous external device that has not been authenticated by the manufacturer as a result of checking the authentication information of the message, the management node 320 may determine that there is a security threat of the vehicle network. That is, the management node 320 may determine that a hacking attempt is made from the outside to the vehicle.

Accordingly, the management node 320 may discard the message received from the external device that attempted hacking. In addition, since a hacking threat may occur from the erroneous external device continuously, the management node 320 may store information on the source address of the erroneous external device that has attempted to hack in the memory of the management node 320 in order to block the communications with the erroneous external device. The management node 320 may block communications with the erroneous external device when a communication access from the erroneous external device is attempted in the future based on the information on the source address of the erroneous external device stored in the memory.

Also, the management node 320 may transmit the information on the source address of the erroneous external device attempting the hacking to the communication node 330. The communication node 330 may store the source address of the erroneous external device attempting to hack into the memory of the communication node 330. Then, the communication node 330 may block communications with the erroneous external device when a communication access from the erroneous external device is attempted in the future based on the information on the source address of the erroneous external device stored in the memory.

As described above, the system for diagnosing a communication error and detecting an unregistered device based on information that Ethernet switches have may store and manage information on the source addresses of the internal devices and external devices of the vehicle in the memory of the management node 320, so that it is made possible to prevent the change of addresses in the in-vehicle network due to communication connections and hacking attempts of the unauthenticated external devices.

The system and method according to the present disclosure may allow update of the address table of the controllers disposed in the vehicle in a restricted manner in order to prevent communication connections and hacking attempts of unauthenticated external devices.

For example, the manufacturer of the vehicle may operate an initial mode (or, diagnostic mode) before delivering the vehicle, connect the diagnostic apparatus 310 to the Ethernet network of the vehicle, and perform a MAC Learning on the at least one communication node 330 and the management node 320 disposed in the vehicle. The source addresses of the controllers connected to the at least one communication node 330 may be updated to the address tables stored in the memory of the at least one communication node 330 through the diagnostic apparatus 310. Also, the source addresses of the controllers connected to the management node 320 may be updated to the address table stored in the memory of the management node 320 through the diagnostic apparatus 310. That is, the MAC addresses of all the controllers disposed in the vehicle may be updated in the memory of the management node 320.

Here, the ECU of the management node 320 and the ECU of the communication node 330 may be configured not to update the address table separately except for the initial mode. When a change is made to the address table stored in the memory of the management node 320, information on the change may be transmitted to a server so that management of the vehicle can be systematically performed. That is, the information about the change of the address table, which the driver does not intend, may be transmitted to the server so that the risk of vehicle hacking due to the access of the external device can be managed.

Accordingly, the system for diagnosing a communication error and detecting an unregistered device based on the information of Ethernet switches may not update the firmware every time the source addresses of the internal devices of the vehicle are changed, but update the firmware or the source addresses only in a predetermined mode (e.g., the initial mode or diagnostic mode). This makes it possible to prevent the change of data in the vehicle due to communication connections and hacking attempts of unauthenticated external devices.

Figure 7:
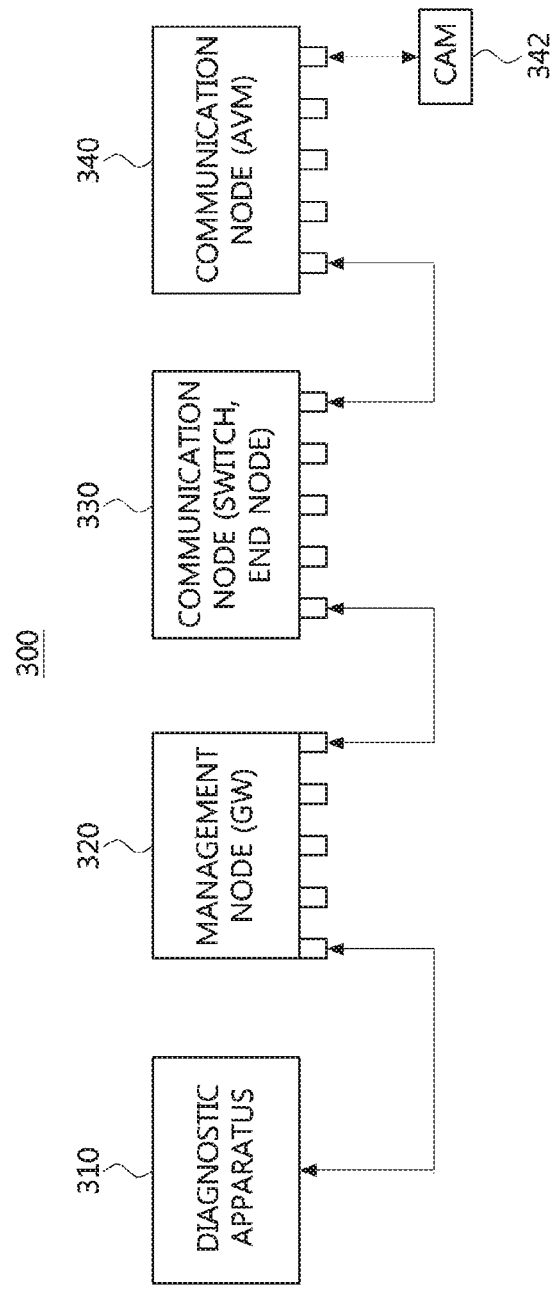
FIG. 7 shows a conceptual diagram of an Ethernet-based vehicle network to which an embodiment of the present disclosure is applied.

FIG. 7 shows a conceptual diagram of an Ethernet-based vehicle network to which an embodiment of the present disclosure is applied.

Referring to FIG. 7, the in-vehicle Ethernet network may comprise the management node 320, the first communication node 330, and a second communication node 340. The diagnostic apparatus 310 may be located outside the vehicle, and the management node 320, the first communication node 330, and the second communication node 340 may be located inside the vehicle.

In FIG. 7, an example in which a camera controller (e.g., an around view monitor (AVM)) is applied as the second communication node 340 is shown. A camera 342 for photographing an external environment may be disposed in the vehicle, and the second communication node 340 and the camera 342 may be connected through a communication port.

A replacement of a communication node may be made by a failure or breakage of the communication node disposed in the vehicle. For example, when replacing the second communication node 340, the source addresses of respective communication ports of the second communication node 340 may be changed. Since the source address of the existing second communication node 340 is stored in the address tables stored in the memories of the first communication node 330 and the management node 320, the existing source address and a new source address of the second communication node 340 may become inconsistent. That is, the source address of the existing second communication node 340 stored in the address tables stored in the memories of the first communication node 330 and the management node 320, and the source address of the newly replaced second communication node 340 may become inconsistent.

Thus, in the system and method according to an embodiment of the present disclosure a source address of a new controller (e.g., the second communication node 340) being replaced may be updated in the address tables stored in the memories of the first communication node 330 and the management node 320, respectively.

For example, the Ethernet network of the vehicle may be connected to the diagnostic apparatus 310, and the diagnostic apparatus 310 may be used to transmit a command to the management node 320 to enter a diagnostic mode. The management node 320 may cause the update of the address table of all the controllers disposed in the vehicle based on the received diagnostic mode entry command Specifically, the management node 320 may transmit a diagnostic mode entry command to communication nodes (end nodes, switches, gateways, and the like) connected thereto. Each communication node (an end node, a switch, a gateway, and the like) that receives the diagnostic mode entry command from the management node 320 may update its address table by performing a MAC learning operation.

Here, the ECU of the second communication node 340 to be newly replaced may transmit an address table including information on its source address to the first communication node 330.

The first communication node 330 may update information of the source address of the newly replaced second communication node 340 to its address table. The first communication node 330 may transmit the information on the source address of the second communication node 340 that has been newly replaced to other communication nodes connected thereto. Each of the communication nodes that have received the information on the source address of the newly-replaced second communication node 340 may update the source address of the second communication node 340 in its own address table. Then, each of the communication nodes may transmit each updated address table to the management node 320. The management node 320 may update its address table only when it is in the diagnostic mode in order to prevent communication connections and hacking attempts of unauthenticated external communication nodes.

FIG. 8 shows a sequence chart for explaining operations of communication nodes focusing a method for detecting a communication error and updating a source address based on information of Ethernet switches according to an embodiment of the present disclosure.

Referring to FIG. 8, when a message is received at the first communication node 330 from the second communication node 340 (S110), the first communication node 330 may compare a source address of the received message with information of the address table stored in the memory (S120). Through this, the first communication node 330 may determine whether the received message is a normal message transmitted from an in-vehicle device (communication node) or a registered normal external device.

As a result of the comparison in the step S120, if the source address of the received message is present in the address table stored in the memory, the first communication node 330 may determine that a normal message is received from the second communication node 340. Then, the first communication node 330 may maintain a communication connection with the second communication node 340 that has transmitted the message (S130). That is, if the source address of the received message is present in the address table stored in the memory, the first communication node 330 may determine that a normal communication connection exists with the another communication node (i.e., the second communication node 340).

On the other hand, if it is determined in the step S120 that the source address of the message received from the second communication node 340 does not exist in the address table stored in the memory of the first communication node 330, the first communication node 330 may transmit information on the received message and the source address of the received message to the management node 320 (S140). At this time, the first communication node 330 may transmit the information on the source address and the received message shown in FIG. 6 through a specific communication port connected to the management node 320 for authentication of the source address of the received message.

Here, since the source addresses of all the communication nodes (internal devices and external devices) of the vehicle are stored in the memory of the management node 320, verification of the source addresses of all the controllers and authentication of the message are possible.

Then, when the message and the information on the source address are received at the management node 320 from the first communication node 330, the management node 320 may compare the received source address with information of the address table stored in the memory (S150).

That is, the management node 320 may determine whether or not the source address of the received message matches the information of the address table stored in the memory of the management node 320, and determine whether the message has been received from a registered (authenticated) communication node (internal device or external device of the vehicle).

If the source address of the received message is present in the address table stored in the memory of the management node 320 as a result of the comparison of the step S150, the management node 320 may determine that a communication error (S160) has occurred between internal communication nodes (S160). That is, the management node 320 may determine that there is a communication error between the internal devices of the vehicle when the source address received from the communication node 330 exists in the address table stored in the memory of the management node 320.

Then, the management node 320 may transmit the verification result of the source address of the received message to the first communication node 330 (S170).

Then, the first communication node 330 may add the source address to the address table stored in the memory based on the verification result of the source address of the received message (S180).

Meanwhile, the management node 320 may store a DTC indicating the communication error between the internal devices of the vehicle in the memory of the management node 320, and display the DTC indicating the communication error to the driver (S190).

FIG. 9 shows a sequence chart for explaining operations of communication nodes focusing a method for detecting an unregistered device and updating a source address based on information of Ethernet switches according to an embodiment of the present disclosure.

Referring to FIG. 9, the operations of the steps S110 to S150 is the same as those of FIG. 8, and thus a detailed description thereof will be omitted.

If the source address of the received message does not exist in the address table stored in the memory of the management node 320 as a result of the comparison of the step S150, an authentication process of the communication node that transmitted the message may be further performed. The management node 320 may identify authentication information included in the received message (S260).

Here, when the MAC address of the address table stored in the memory and the source address information received by the communication node 330 do not match, the management node 320 may determine that the message has been received from an external device of the vehicle.

As a result of the step S260, if the authentication information for the received message does not exist or the authentication information included in the message does not match the preset authentication information, the management node 320 may determine that an authentication failure (e.g., a hacking attempt) has occurred (S270).

Specifically, when the authentication information for the received message does not exist or the authentication information included in the message does not match the preset authentication information, the management node 320 may determine that an unauthenticated external device (i.e., an unregistered external device) connects to the Ethernet network of the vehicle. That is, the management node 320 may determine that the message has been received from an unauthenticated external device and a security threat (hacking attempt) has occurred. In this manner, the management node 320 may discard the message received from the unauthenticated external device when it is determined that the message is received from the erroneous external device that is not authenticated by the manufacturer as a result of checking the authentication information of the message.

On the other hand, if it is determined in the step S260 that the authentication information included in the message is identical to the preset authentication information, the management node 320 may determine an authentication success and determine that the message has been received from the external device authenticated by the vehicle manufacturer. Then, the management node 320 may add the source address of the authenticated external device to the address table stored in the memory of the management node 320 (S270).

Then, the management node 320 may transmit the authentication result to the first communication node 330 (S280).

If the authentication fails in the step S270, the first communication node 330 may block the communication connection with the unauthenticated device since it is determined that the message has been received from the unauthenticated external device (S290). The first communication node 330 may immediately block communications from the external device and discard the received message.

Also, if the authentication fails in the step S270, the first communication node 330 may add the source address of the authenticated external device to the address table stored in the memory (S290).

Then, the management node 320 may store information on the source address of the external device that has attempted the hacking to the memory of the management node 320 so that communications with the erroneous external device can be blocked.

Also, the management node 320 may transmit the authentication result of the received message and the information on the source address to other communication nodes (end nodes, switches, gateways, etc.) connected to the management node 320 (S300).

Each of the end nodes, the switches, and the gateways receiving the authentication result and the information on the source address from the management node 320 may update the address table stored in the memory based on the authentication result.

As described above, the system and method based on information of Ethernet switches according to the embodiments of the present disclosure may store and manage information on source addresses of internal devices and external devices of the vehicle in the memory of the management node 320. Accordingly, it is made possible to prevent changes of in-vehicle addresses due to a communication connection and hacking attempt of an unauthenticated external device by checking authentication information of a message received from an external device.

Also, the system and method based on information of Ethernet switches according to the embodiments of the present disclosure may allow restricted updates of address tables of devices disposed in a vehicle in order to prevent communication connections and hacking attempts of unauthenticated external devices.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node among a plurality of communication nodes constituting an Ethernet-based vehicle network, comprising:
   receiving, by a processor, a message from a second communication node;
   determining whether a source address of the message exists in a first address table stored in a memory of the first communication node;
   in response to determining that the source address of the message does not exist in the first address table, transmitting the message and information on the source address of the message to a management node; and
   receiving a verification result for the source address of the message from the management node,
   wherein, when the verification result is that the source address exists in a second address table stored in a memory of the management node, a communication error between communication nodes constituting the Ethernet-based vehicle network is determined.

2. The operation method according to claim 1, further comprising adding the source address in the first address table when the source address of the message is determined to exist in a second address table stored in the management node based on the verification result.

3. The operation method according to claim 1, further comprising transmitting information on the source address of the message to a third communication node connected to the first communication node when the source address of the message is determined to exist in a second address table stored in the management node based on the verification result.

4. The operation method according to claim 1, further comprising receiving an authentication result for the message from the management node.

5. The operation method according to claim 4, further comprising adding the source address in the first address table when the message is determined as being authenticated based on the authentication result.

6. The operation method according to claim 5, further comprising transmitting information on the source address to a third communication node connected to the first communication node.

7. The operation method according to claim 4, further comprising releasing a communication connection between the first communication node and the second communication node when the message is determined as being not authenticated based on the authentication result.

8. An operation method of a management node in an Ethernet-based vehicle network, comprising:
   receiving, by a processor, a message and information on a source address of the message from a first communication node;
   determining whether the source address of the message exists in an address table stored in a memory for all communication nodes constituting the Ethernet-based vehicle network; and
   in response to determining that the source address of the message exists in the address table, determining that a communication error between communication nodes constituting the Ethernet-based vehicle network occurred and transmitting a verification result for the source address to the first communication node.

9. The operation method according to claim 8, further comprising transmitting the source address and a verification result for the source address to a second communication node connected to the management node when the source address exists in the address table.

10. The operation method according to claim 8, further comprising storing a diagnostic trouble code indicating a communication error in the memory and displaying the diagnostic trouble code in at least one of a visual manner and an auditory manner when the source address exists in the address table.

11. The operation method according to claim 10, further comprising transmitting the diagnostic trouble code to a diagnostic apparatus connected to the management node.

12. The operation method according to claim 8, further comprising, in response to determining that the source address of the message does not exist in the address table, performing an authentication of the message and transmitting an authentication result for the message to the first communication node.

13. The operation method according to claim 12, further comprising adding the source address of the message in the address table when the message is determined as being authenticated based on the authentication result.

14. The operation method according to claim 13, further comprising discarding the message and transmitting the source address and the authentication result to the first communication node and a second communication node connected to the management node when the message is determined as being not authenticated based on the authentication result.

15. The operation method according to claim 12, further comprising transmitting the source address and the authentication result to a second communication node connected to the management node when the message is determined as being authenticated based on the authentication result.

16. A management node constituting an Ethernet-based vehicle network, comprising a processor and a memory storing at least one instruction executed by the processor and an address table for all communication nodes constituting the Ethernet-based vehicle network, wherein the at least one instruction, when executed, causes the processor to:
receive a message and information on a source address of the message from a first communication node, and determine whether or not the source address of the message exists in the address table; and
in response to determining that the source address of the message exists in the address table, determine that a communication error between communication nodes constituting the Ethernet-based vehicle network occurred, and transmit a verification result for the source address to the first communication node.

17. The management node according to claim 16, wherein the at least one instruction further causes the processor to, in response to determining that the source address of the message does not exist in the address table, perform an authentication of the message and transmit an authentication result of the message to the first communication node.

18. The management node according to claim 17, wherein the at least one instruction further causes the processor to add the source address in the address table when the message is determined as being authenticated based on the authentication result.

* * * * *